No. 613,049.   P. H. STEDMAN.   Patented Oct. 25, 1898.
VOTING MACHINE.
(Application filed Mar. 7, 1894.)
(No Model.)   7 Sheets—Sheet 1.
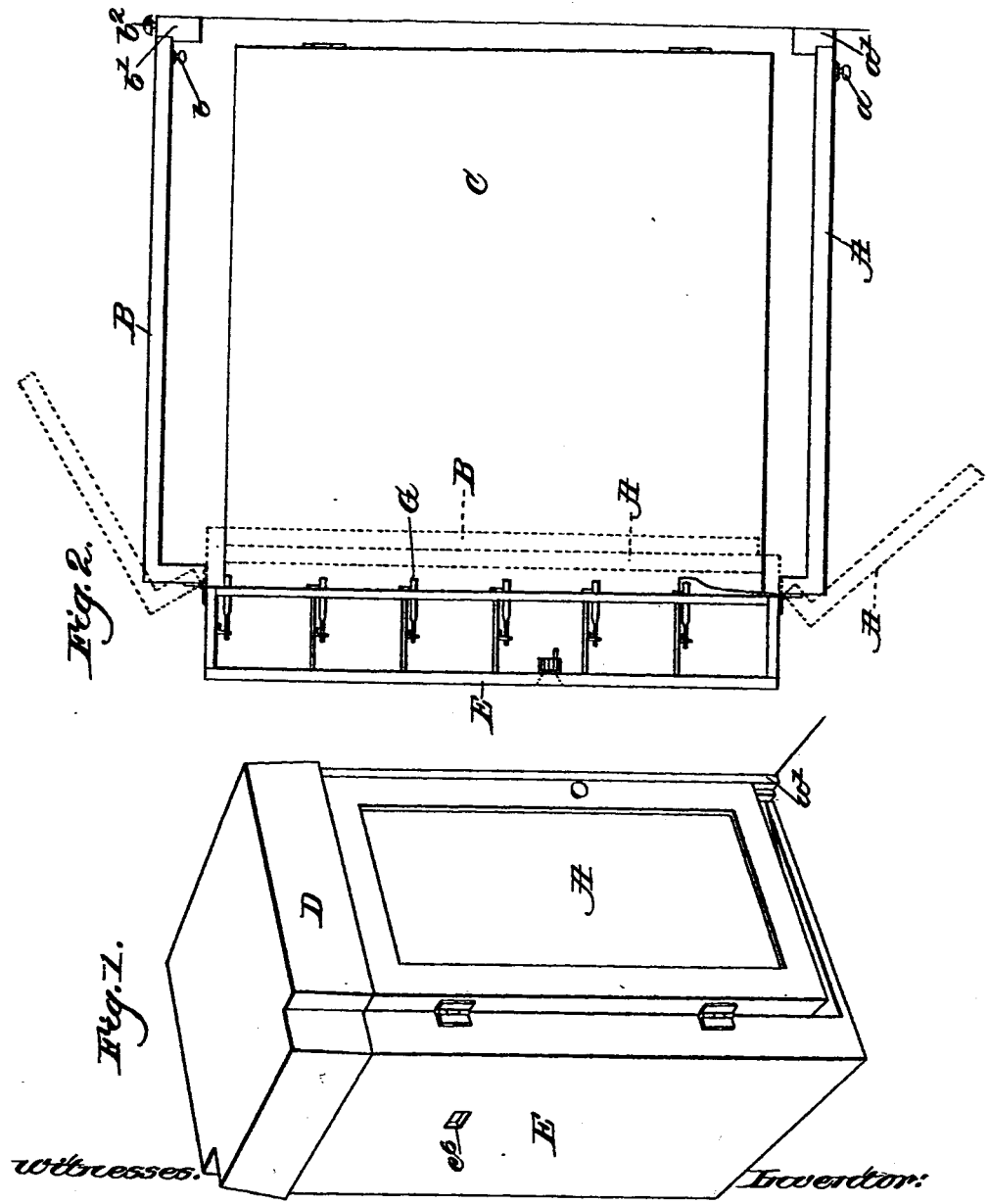

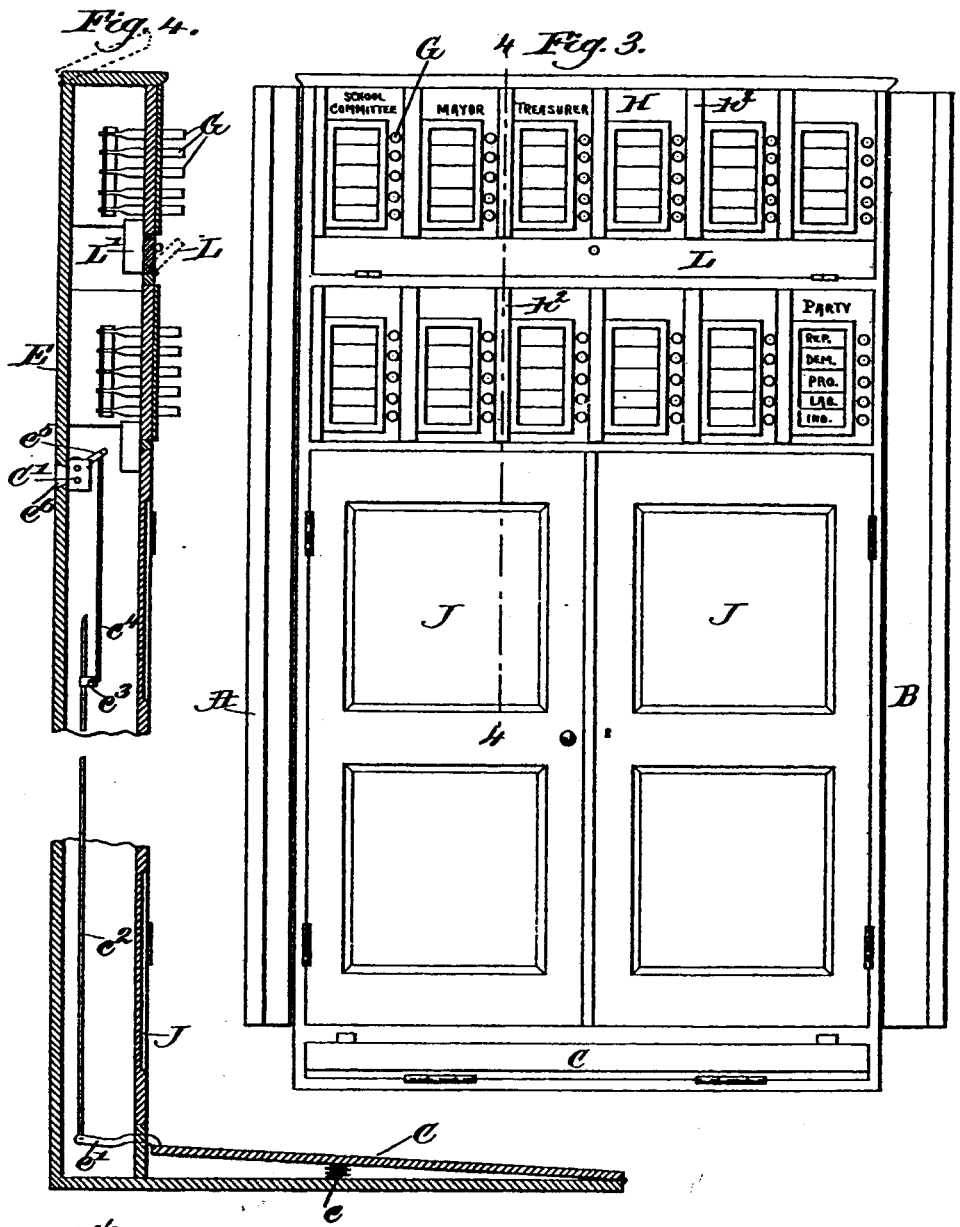

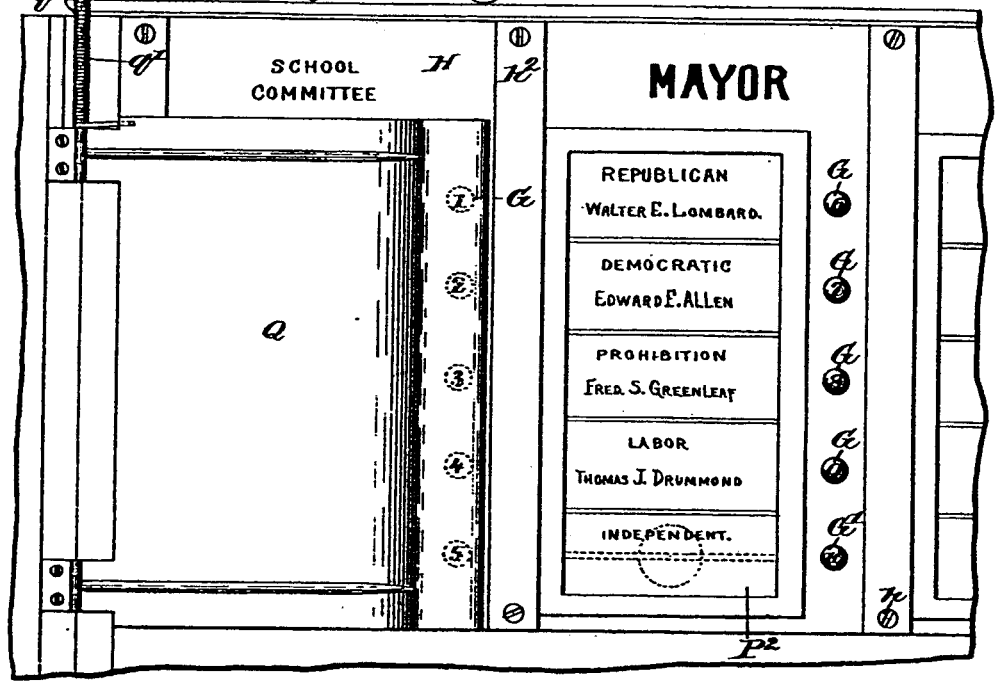
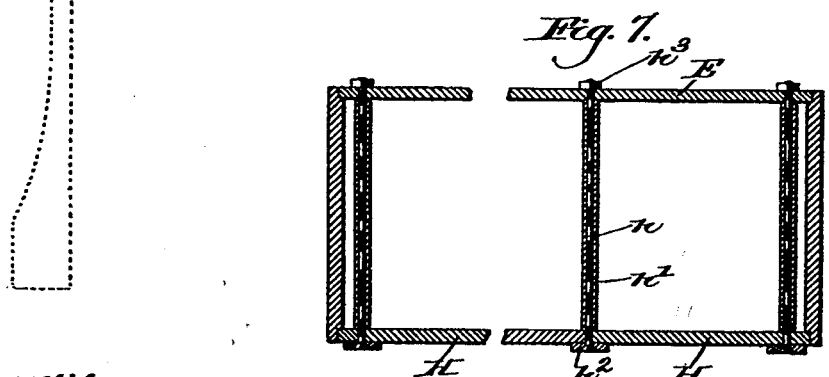

No. 613,049. Patented Oct. 25, 1898.
P. H. STEDMAN.
VOTING MACHINE.
(Application filed Mar. 7, 1894.)
(No Model.) 7 Sheets—Sheet 4.
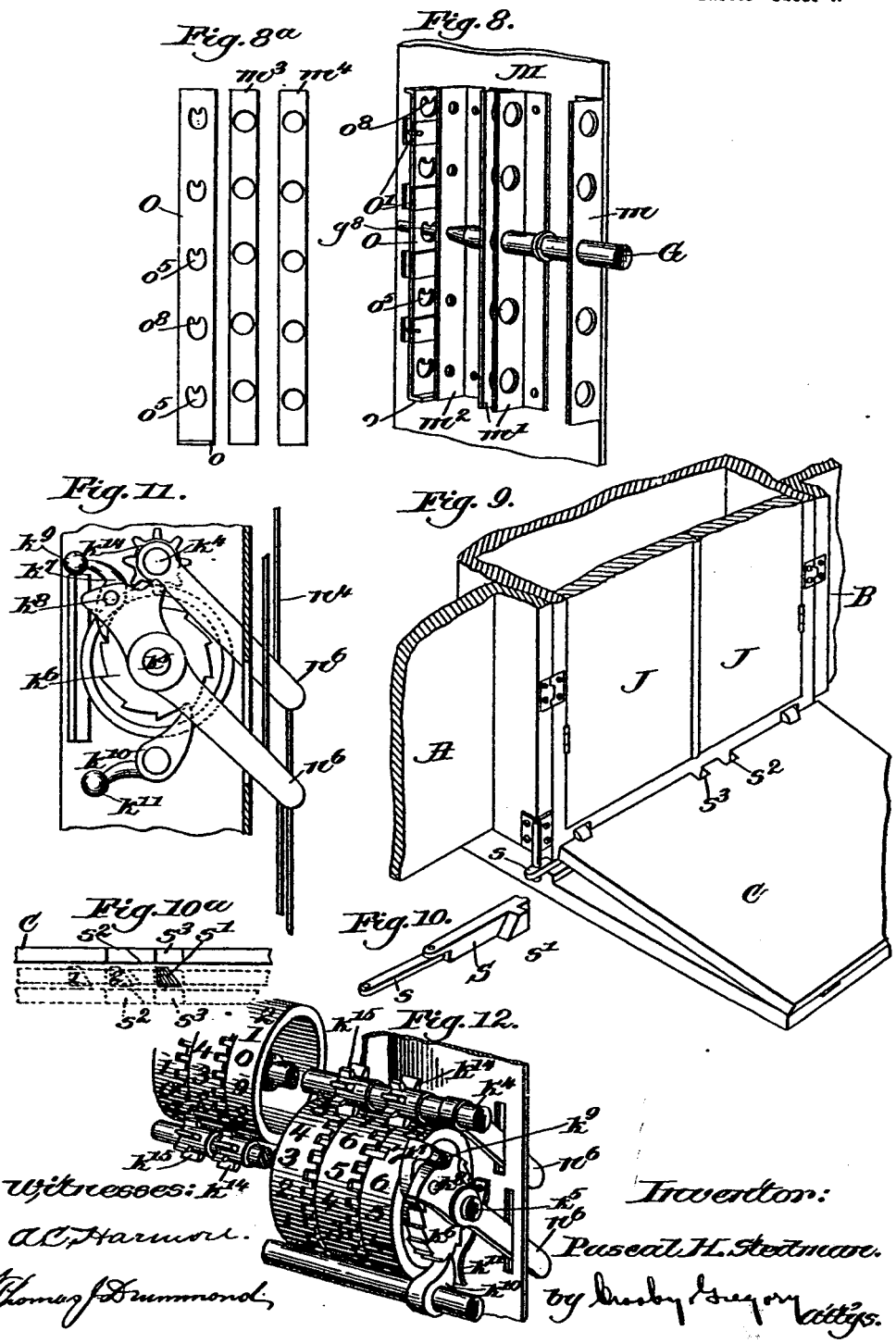

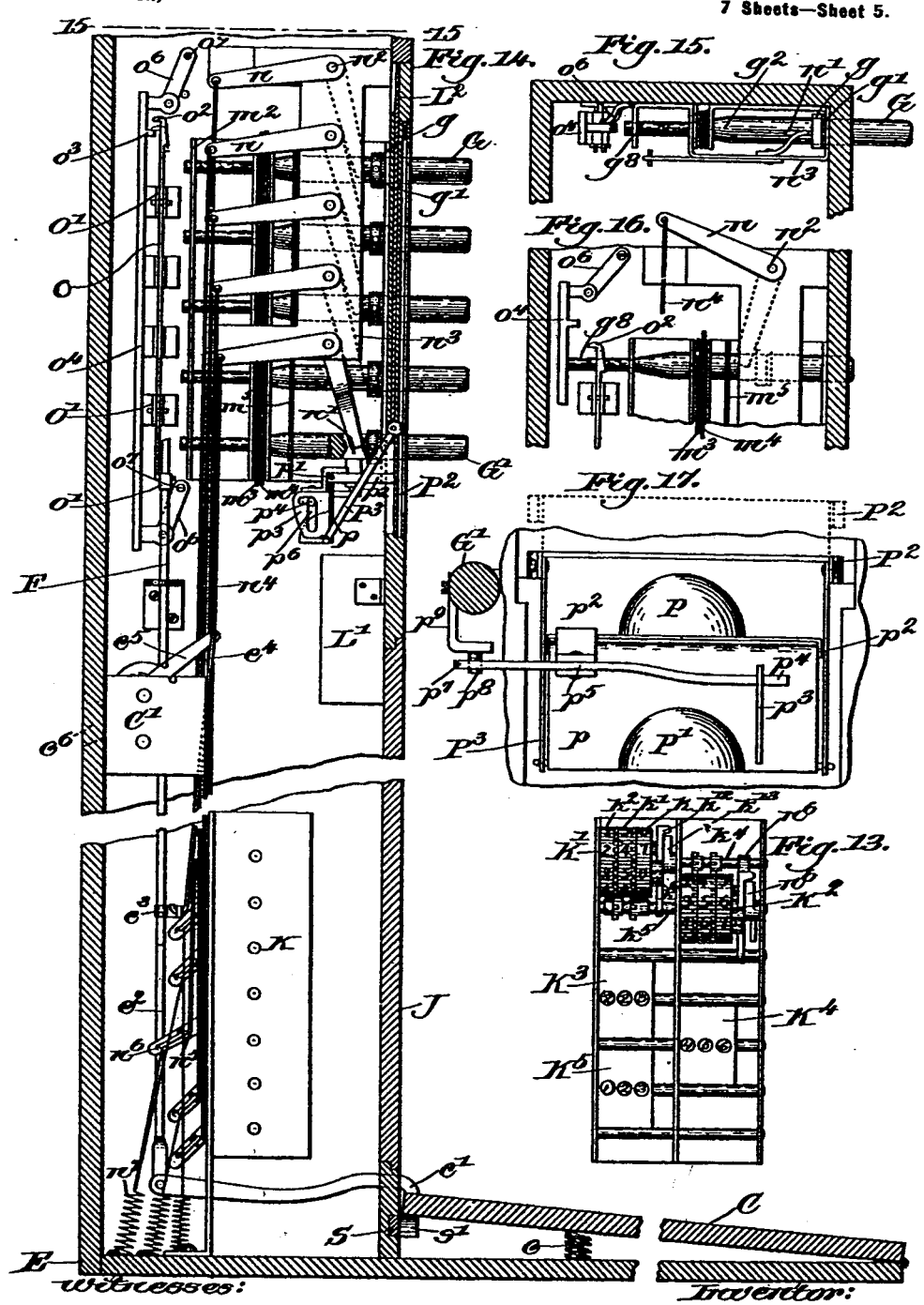

No. 613,049. Patented Oct. 25, 1898.
P. H. STEDMAN.
VOTING MACHINE.
(Application filed Mar. 7, 1894.)

(No Model.) 7 Sheets—Sheet 6.

Witnesses:
Inventor:
Pascal H. Stedman

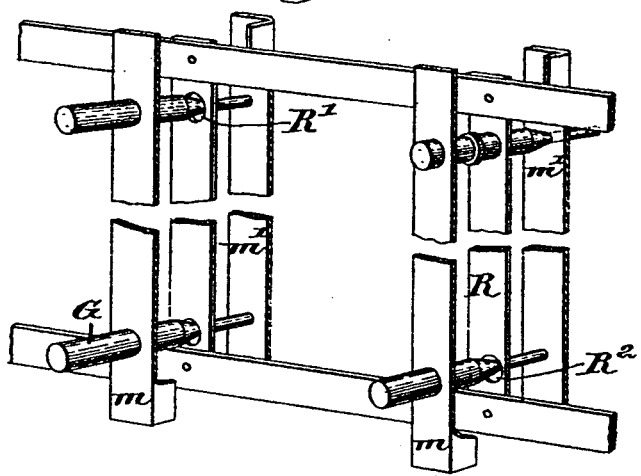
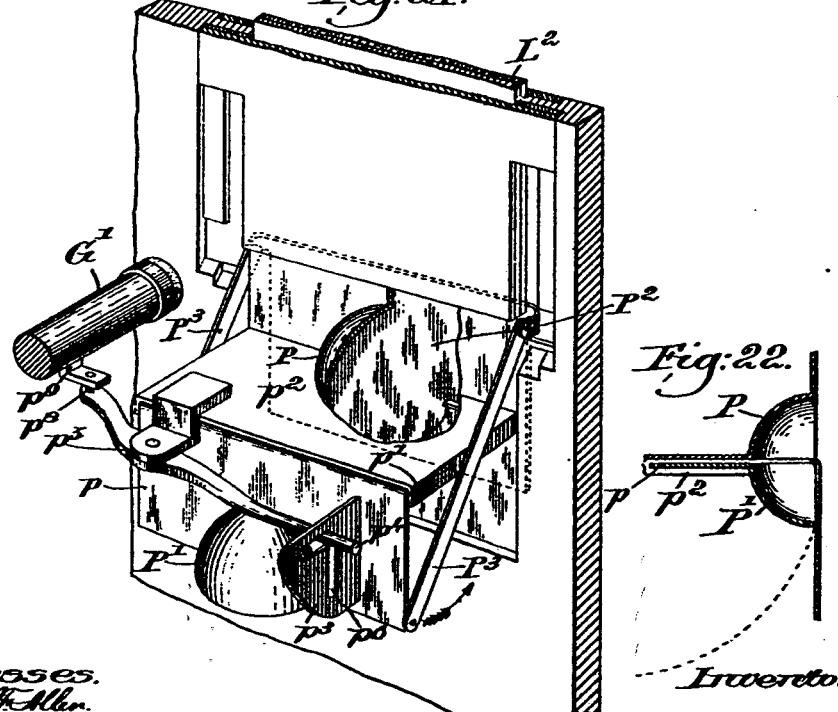
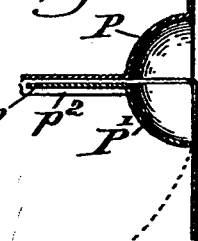

UNITED STATES PATENT OFFICE.

PASCAL HYDE STEDMAN, OF NEWPORT, RHODE ISLAND.

VOTING-MACHINE.

SPECIFICATION forming part of Letters Patent No. 613,049, dated October 25, 1898.

Application filed March 7, 1894. Serial No. 502,787. (No model.)

*To all whom it may concern:*

Be it known that I, PASCAL HYDE STEDMAN, of the city of Newport, county of Newport, and State of Rhode Island, have invented a Mechanical-Voting Machine to be known as the Mechanical Australian System of Voting; and I do hereby declare the following to be a full, clear, and exact description of the same, reference being had to the accompanying drawings, forming a part of this specification, and to the letters of reference marked thereon.

My invention relates to the Australian system of voting by a mechanical method.

The object is to provide secret means of ascertaining the will of the people by a simple and easily-constructed machine that registers each vote as made on dials that are locked and are covered by doors that are only seen by the proper official. The voter has a choice of candidates that are on the regularly-nominated ticket, also the privilege of voting an independent ticket of his own choice that is registered on a dial provided for the same.

When the voting-machine is not occupied, a vote cannot be made in any other way than by depressing the platform.

A door is provided to cover one or more sections of the voting-machine to discriminate between registered and real-estate voters. This door is hinged to the entrance-door, and it does not interfere with its operation, but it is operated independently to cover one or more sections. I also provide one section that is devoted to the straight-party-ticket vote, and when any one key is operated in this section it registers on a dial connected to it, and this dial counts for all the candidates that are on the ticket of the party voted for. A vote cannot be repeated or more than one key operated at the same time by one voter in each section.

The invention consists in certain novelties of construction and combinations of parts, all as will be hereinafter fully described, and the novel features pointed out in the claims at the end of this specification.

Figure 18:
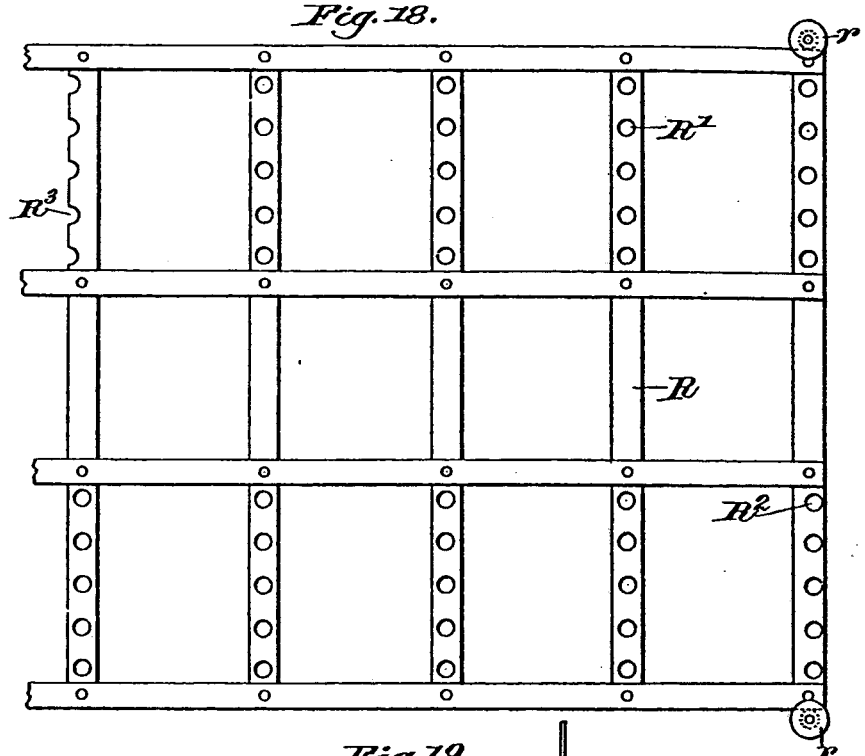
Figure 19:
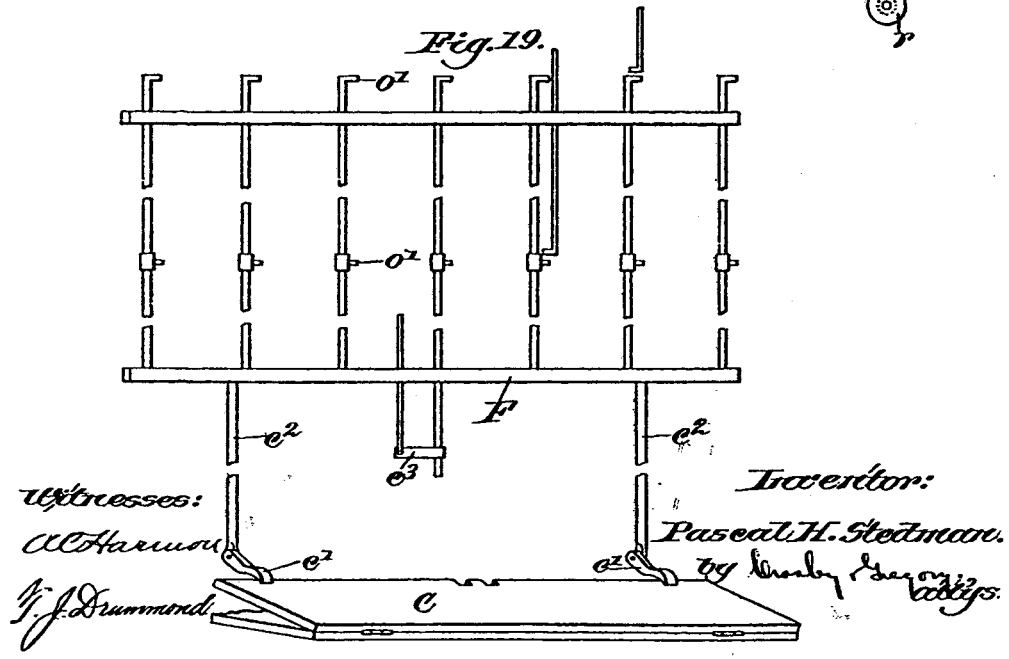

In the accompanying drawings, illustrative of my invention, Figure 1 is a perspective view of a booth or voting-box. Fig. 2 is a top plan view of the same with the cover or awning removed. Fig. 3 is a front elevation of the booth. Fig. 4 is a vertical section on the line 4 4 of Fig. 3. Fig. 5 is a fragmentary detail in elevation of a portion of Fig. 3, showing the door for limited voting. Fig. 6 is a central horizontal section of the door shown in Fig. 5, also showing in dotted lines the normal position of the same under the influence of its spring-actuator. Fig. 7 is an enlarged detail, in horizontal section, showing the manner in which the sections are joined together. Fig. 8 is a detail in perspective of a guide and interlocking plate for one of the sections, showing a voting-key in voting position. Fig. 8ª is a detail in front elevation of the locking-bar and the interlocking bars. Fig. 9 is an enlarged view, in broken perspective, of the lower portion of the voting-frame, showing the spring-actuated platform in position to lock the doors in open position. Fig. 10 is a detail in perspective of the locking lug and rod for maintaining the platform of the booth in operative position. Fig. 10ª is a fragmentary detail showing the operation of the locking-lug. Fig. 11 is an end elevation of one of the registering mechanisms. Fig. 12 is a perspective view of a portion of the registering mechanism. Fig. 13 is a front elevation of the registering mechanism for one section, the upper slotted face-plates being removed. Fig. 14 is a central vertical section of the voting-booth with portions broken away in order to permit the same to be shown on an enlarged scale. Fig. 15 is a horizontal section on line 15 of Fig. 14. Fig. 16 is an enlarged sectional detail of a portion of the mechanism connected with the top voting-key shown in Fig. 14, said key being in voting position. Fig. 17 is a front elevation of the independent-voting receiver. Fig. 18 is a front elevation of the detector-frame for permitting any one straight-party vote and locking all other keys from voting. Fig. 19 is an elevation in broken detail of the actuating-frame for registering the number of voters and for simultaneously releasing the keys which were voted by the previous voter. Fig. 20 is a detail perspective, partly in section, showing the operation of the detector-frame shown in Fig. 18. Fig. 21 is an enlarged perspective view showing the details of the independent-voting mechanism. Fig. 22 is a sectional detail showing the thumb-recess formed by the closed table of the independent-voting mechanism.

In the present embodiment of my invention, A designates the entrance-door to the booth or voting-box, which will be under the control of an election guard and inspectors, according to the requirements of law, and B designates the exit-door of the said booth, mounted on spring-hinges to normally close the same against spring-lock $b$, accessible only from the inside. When not in use, these doors are arranged to fold one on the other in compactly-closed position, as shown in dotted lines in Fig. 2.

When in use, the posts $a'$ $b'$ are provided and arranged, as shown in Fig. 2, adjacent the outer corners of the platform C to limit the inward swing of the doors and form, together with the cover or awning D and the body-inclosing case E of the voting mechanism, a closed booth, in which the voter may enter and register his vote, as hereinafter described, the election-guard controlling the voter's entrance at the door A by means of the knob or lock $a$, a bell $b^2$ automatically announcing the exit of the voter by means of the door B.

The platform C is hinged at its forward end and normally raised by means of the spring $c$, this provision being made in order to automatically register the number of voters. In order to effect this, the platform is provided at its free raised end with one or more arms $c'$, which are pivoted at their inner ends to the connecting-rods $c^2$ of the registering and releasing frame F, which has suitably connected thereto, by means of the sleeve $c^3$ and the link $c^4$, a lever $c^5$ to operate the register C' of voters provided at the rear side of the case E.

A suitably-protected side opening $c^6$ is provided opposite the dials of the register C' in order that the election-inspectors may observe the same to be certain that each voter is registered.

The register C' of voters may be of any usual kind; but it is preferably constructed the same as the mechanism to register the votes, which forms a part of my invention and is hereinafter described.

The voting mechanism is arranged in sections corresponding in number to the number of officers and parties and arranged in any suitable manner, my preferred arrangement being, as herein indicated, to have one section for each office, with separate spaces and voting-keys in each section for the nominee for that office of each party. This is indicated in the upper row of sections, Fig. 3, in which the left-hand section has spaces, as indicated, for the nominee for mayor of each of five parties, (see Fig. 5,) with the voting-keys G for each nominee, the section for the clerk, treasurer, and other officers to be elected being arranged, as indicated, in succeeding sections to the right of the section for mayor.

These sections will be arranged in tiers, as will be found necessary, two tiers being shown in the present instance, and in the lower tier I have indicated at the right a section for straight-party votes, the mechanism of which will be hereinafter described. These sections are composed of a suitable frame H, preferably of cast metal, as best shown in Figs. 5 and 7, which hold a suitable protecting-cover, of glass, behind which the names of the different nominees and other requisite data may be placed, the frames of the adjoining sections being bolted together and to the voting-case E by means of bolts $h$, passed through suitable spacing-sleeves $h'$ and holding the parts together by means of suitable head-plates $h^2$ at the front side thereof and nuts $h^3$ at the rear side.

Referring again to Figs. 3 and 4 more particularly, J J indicate doors for giving access to the voting-dials and registering mechanism K, Fig. 14, and L indicates the hinged door covering the independent-vote receptacle L' and also covering the openings in the adjacent two tiers of sections for receiving the candidates' name-cards L².

The voting-keys G operate by means of the following mechanism to register the votes, one key being provided for each space in a section, as best shown in Figs. 3 and 5, and all the keys throughout the case being permanently numbered, as shown in Fig. 5. These keys pass inwardly through the casing and are held against undue outward movement by means of shoulders $g$, secured thereto in proper adjustment, and interposed washers $g'$, of felt or other suitable material, to prevent undue noise in operating the same. These keys are provided with a sloping shoulder $g^2$ about midway of their length and are thence tapered inwardly toward the end, each key being supported in the guide-plate or guide and interlocking plate M by means of the outer flange $m$, the intermediate flanges $m'$, and an inner flange $m^2$, each of these flanges being suitably perforated to direct the respective voting-keys for accurate movement.

Loosely suspended between the intermediate flanges $m'$ of the plate M, I provide in the present instance of my invention the perforated interlocking bars $m^3$ $m^4$, (see Fig. 8ª,) which are loosely mounted on the respective locking-keys of the section. The perforations of these bars do not correspond with each other and are not in exact alinement with the perforations in the adjacent flanges $m'$ and are located in respect to the voting-keys G, when the latter are in non-voting position, so as to rest on the keys near the smaller end of the tapered shoulder portion $g^2$, as shown in Figs. 14 and 15. When, however, any key G is pressed in to register a vote, the one or the other of these bars $m^3$ $m^4$ will be moved upwardly by means of the shoulder $g^2$, in order to allow the key to be pressed inwardly, as shown in Fig. 16. This movement will cause the respective perforations of the two bars $m^3$ $m^4$ to overlap sufficiently to lock all the other keys of the section against movement, it then being impossible to operate any other key until the depressed or voted key is retracted to its normal non-voting position. A strengthening-flange and guide-plate $m^5$ may be provided to aid in preventing the bending of the keys or the spreading of the flanges by the attempt to force in a second key in the section. By this means it becomes impossible for any voter to vote for two separate candidates for the same office, or, in other words, to operate two voting-keys in the same section.

The registering of the vote is done by means of the bell-crank lever $n$, Fig. 14, operated by the voting-key G, through its loose engagement therewith in the slot $n'$. The bell-crank lever $n$ is pivoted at $n^2$ to the bracket $n^3$ and carries in loose engagement at its outer end the rod $n^4$, which is connected at its lower end $n^5$ to the pawl-lever $n^6$ of the corresponding registering apparatus.

As shown, there are five voting-keys in each section, and accordingly there are five separate registering-dials, each having its own independent apparatus, which I have designated in Fig. 13 as K' $K^2$ $K^3$ $K^4$ $K^5$, and which will be described later on.

In order to insure certainty of registration, and also to positively retract the voting-key after the voter has left the booth, each pawl-lever $n^6$ is provided at its outer end with a spring $n^7$, connected to the casing E. These springs are normally under tension, pulling down on the rods $n^4$ of their respective bell-crank levers $n$, tending to throw and maintain the voting-keys in their retracted or outermost position, as shown in Fig. 14.

In order that when a voter has once voted in a certain section by pushing in one of the keys G thereof the key thus voted may not spring back and thereby enable the voter to again push it in and thus repeat his vote, I have provided the locking-bar O, Figs. 8 and 8ª, which reciprocates loosely in the guide-brackets O'. This locking-bar is normally raised in the path of the voting-keys into the position shown in full lines in Fig. 14 by means of its foot resting on a shoulder or pocket $o'$ on the actuating-frame F. When, however, a voter steps on the platform C, the actuating-frame F is depressed by means of the arms $c'$ and rod $c^2$, as before explained, so that the shoulder $o'$ is removed from beneath the locking-bar and the latter is intercepted in its fall by contact of its hooked upper end $o^2$ with the lug $o^3$ of the plate $o^4$, the locking-bar O then assuming the position shown in dotted lines in Fig. 14, having its apertures $o^5$ alined with the voting-keys. The plate $o^4$ is pivoted at either end by means of the links $o^6$ to the casing or to rods $o^7$, secured at either end to the casing, so that the plate $o^4$ is free to swing in a vertical position toward and from the locking-bar O.

The locking-bar O is provided with the apertures $o^5$, corresponding to the apertures in the flanges $m$ $m^2$, and these apertures are of a size to admit the smaller ends of the locking-keys G, each aperture at its upper side being provided with a locking-tongue $o^8$ and each key being provided at its upper side with one or more notched recesses $g^3$, which are sharply formed at their inner ends and slope therefrom toward their outer ends, as shown in Fig. 15. Thus when the platform C is in its raised position it is impossible to register a vote by pushing in any of the keys G, for the reason that the locking-bar O is in its raised position to interpose a solid portion in the path of the voting-key; but when a voter has stepped on a platform, depressing the same and thereby lowering the locking-bar to its dotted-line position in Fig. 14, if a voting-key G is pressed inwardly it enters through one of the openings in the locking-bar O and presses against the plate $o^4$, swinging the same on its pivots $o^6$ slightly until the lug $o^3$ is moved out of engagement with the hooked end $o^2$ of the locking-bar O, permitting the latter to fall by gravity against the voting-key, the tongue $o^8$ coming into locking engagement with the notch $g^3$. The rearwardly-sloping form of the notch, however, permits the voting-key to be pushed inwardly to the full extent of its movement, Fig. 16, but the sharp inner shoulder of the notch prevents the key from being thrown outwardly to its normal position by its spring $n^7$ and holds it firmly locked. In a similar manner the voter votes for one candidate in each of the different sections by pushing in the desired key in each section, the operating-keys and all the sections being constructed as above described.

The moment that the voter steps off from the platform C the springs $c$ force the platform upwardly, and thereby raise the actuating-frame F, through the intermediate arms $c'$ and rods $c^2$, so that the shoulders $o'$ strike against the feet of the respective locking-bars O and raise those that may have been depressed into the position shown in full lines in Fig. 14, thereby disengaging the locking-tongues $o^8$ from the voted keys G and at once permitting the springs $n^7$ to eject the keys G to their normal position, restoring the voting apparatus to its position ready to receive another voter. As soon as the voted keys are retracted from the position shown in Fig. 16 the plates $o^4$ fall by gravity to their normal position, as shown in Fig. 14, with the lugs $o^3$ in position beneath the hooked ends $o^2$ of the locking-bars to intercept the same in their fall whenever another voter steps on the platform.

The above description applies in case the voter chooses to vote for one of the regular nominees; but if he prefers to vote an independent ticket of his own selection I have provided the independent-voting mechanism shown in Figs. 21, 22, 14, and 17, and indicated in Fig. 5. One of these independent spaces, Fig. 5, is provided in the different sections for the various offices and is controlled by the adjacent voting-key G'. This voting-key operates mechanism to register the vote precisely the same as in the other mechanism above described; but in order that the voter may prepare his own ballot and deposit the same with certainty and secrecy I have provided a swinging table $p$, pivoted at $p'$ to a suitable bracket $p^2$ and having at its rear side a cam-plate $p^3$ for actuating the same. The free end $p^4$ of a lever centrally pivoted at $p^5$ to a projection of the bracket $p^2$ operates in the cam-slot $p^6$ of the plate $p^3$ to swing the table $p$ from its lower position, as shown, to its raised position, as indicated in Fig. 5, the key G' engaging the outer end $p^7$ of the lever by means of the pin $p^8$, depending from the arm $p^9$, fast on the key G'. When the key G' is pressed inwardly by the independent voter, the free end $p^4$ of the lever is thrown forwardly and travels in the cam-slot $p^6$ to throw the table $p$ up into horizontal position against the bracket $p^2$, the latter being provided with a portion P of a hemispherical recess, the other portion P' being formed in the table $p$, which when closed together, as shown by dotted lines in Fig. 5, afford access to the thumb and finger of the voter for the deposit of his ballot in the opening between the bracket $p^2$ and the table $p$. When the ballot is thus deposited on the table $p$ and the voter has stepped off from the platform C, the key G' is forced outwardly by means of its spring $n^5$ and swings the table $p$ down on its pivot $p'$ and allows the ballot to drop into the independent-ballot box L', from which the collected ballots are removed at the proper time by letting down the door L.

In order that the apertures for the independent ballots may be normally closed, I have provided the sliding cover P² therefor, arranged to slide in ways at either side of the frame H and actuated by means of links P³, pivoted at either end to the upper end of the sliding cover P² and the outer end of the swinging table $p$. Thus when the table $p$ is swung upwardly it at the same time slides the cover P² before it away from the opening P P' for the independent ballot.

When a voter wishes to vote the straight-party ticket and does not wish to select the various candidates in the separate sections, as indicated in the upper tier of sections, Fig. 3, I have provided mechanism by means of which he may vote for all of the candidates of his party by pressing in one key, as indicated at the right-hand section in the lower tier of sections, Fig. 3. Each key and its actuated mechanism is the same in this section as that described above for the other sections; but in order that the voting of any one key in this section may prevent the voter from being able to press in any other key in that section or in any other section I have provided a detector-frame R. (Shown in Figs. 18 and 20.) In this frame each upright is provided with engaging portions, which may be in the form of apertures R', which normally register with the various keys of the different sections and do not interfere with the operation of the same. However, the upright for the straight-party section, herein indicated as at the lower right hand, is provided with engaging portions, herein shown as apertures R², which are slightly to one side of the center and do not register exactly with the keys for the straight-party section, thus the whole frame being free to move laterally on suitable friction-rollers $r$ or other guiding means. When a key is pushed in to vote the straight-party ticket, the whole frame is thereby pushed slightly to one side, herein shown as to the left, by means of the shouldered portion $g^2$ of the key, and thereby every other key in the voting-booth is locked against the possibility of being voted by reason of the aperture R' binding against the key on one side of its smaller portion $g^2$. These engaging portions may be in the form of notches, as shown for convenience at R³ in Fig. 18, notches being more convenient when the frame is adjusted to the voting-machine after the latter is completed.

The different keys of the straight-party section are locked against each other by means of the bars $m^3$ $m^4$, the same as described for the keys of the other sections, or the apertures R² may be slightly out of alinement with each other, so that the moving of any one will not only slide the whole frame sufficiently to lock all the other sections against being voted, but will also lock the remaining keys of the straight-party section.

I afford means for a limited vote in cases where the law has a property or other qualification for the voting privilege on certain questions by providing a door Q, Fig. 5, adapted to cover such section or sections in the voting-booth as relate to the subject requiring a limited vote. This door Q is hinged adjacent the door A and is provided at its end with a longitudinal pocket Q', adapted to receive and tightly inclose the voting-keys of the section desired. It is also provided with a rod $q$, extending, preferably, from its hinge upwardly, around which a spring $q'$ is coiled and connected, under tension, at one end with the door Q and at its other end with the casing of the voting-booth, so as to give the door a normal tendency to swing into close contact with the entrance-door A. The rod $q$ has fixed thereon at its upper end a handle $q^2$, which is provided at its outer end with a latch $q^3$, pivoted thereto and adapted to be turned down, as shown in Fig. 5, and to engage with the latch-plate $q^4$ to hold the door Q in closed position against the locking-keys of the limited-voting section. Thus when a voter enters the booth who has no right to vote the entire ticket because lacking the special-suffrage qualifications the guard turns the handle $q^2$ around toward the booth and throws down the latch $q^5$ to lock the door in position, as shown in Fig. 5, so that the voter has access only to those sections which he is legally permitted to vote. For other voters who have the right to vote the entire ticket, as represented by all the sections, the latch $q^5$ is upturned into its unlocked position, so that the door Q swings normally with the entrance-door A under the influence of the spring $q'$.

In order that no fraud may be perpetrated by the voter within the booth pressing in all the keys that he has a right to and then by some means raising his weight from the platform C while still within the booth, so that the keys might all be restored to their normal position, and thus permit him to repeat his votes, I have connected the entrance-door A at its lower end with a rod S by means of a link $s$, this rod being arranged to slide (see Figs. 9 and 14) directly beneath the platform when the latter is in its raised position. This rod S is provided with a beveled lug $s'$, extending forwardly therefrom, and the platform is provided with notches $s^2$ $s^3$, adapted to receive the lug $s'$ according to the position of the latter, the space between the notches $s^2$ $s^3$ being beveled on its farther side, as shown in Fig. 10$^a$. The operation of this feature of my invention is clearly illustrated in Fig. 10$^a$, the normal position of the locking-lug being shown in full lines.

When a voter enters the booth, the platform C is thereby depressed into the lowermost position of Fig. 10$^a$ and the entrance-door A is closed, thus sliding the rod S and the lug $s'$ over to the position marked 1, the lug in this position serving to lock the platform in its depressed position, so that the platform cannot be raised until the entrance-door A is swung partly open, so as to bring the locking-lug $s'$ into the position 2. When in this position, the actuating-spring $c$ of the platform C will cause the platform to spring up somewhat. The platform should be raised by its actuating-spring into its normal elevated position; but if for any reason it should not rise to its full-line position, but should remain partly elevated, as shown in dotted lines of the intermediate position in Fig. 10$^a$, the beveled face of the lug $s'$ will wedge against the opposing beveled face of the notch $s^2$ of the platform, and the further swing of the door A into its fully-open position will force the platform into its fully-raised or full-line position, the complete opening of the door A bringing the lug $s'$ again into its position, as shown in full lines, Fig. 10$^a$. By means of this mechanism I not only provide against fraud in repeating votes, but I make it absolutely certain that the register of voters C' shall be properly actuated by each movement of the platform C, and also that the actuating-frame F shall be properly raised to entirely restore all of the voting-keys G and thereby place the voting mechanism in proper operative position for the next voter.

It is not necessary that the platform C should be hinged, nor that the notches should be at the front edge thereof, inasmuch as the platform might move bodily up and down and the notches might be variously placed.

In Figs. 11, 12, and 13 I have shown the registering apparatus for one section, it being understood that similar apparatus is provided for each of the sections contained in the voting-booths.

I have herein shown five voting-keys in each section, and accordingly there are five registering-dials and sets of mechanism in each frame K. These are arranged to operate in pairs, the registering wheels or barrels $k$ $k'$ $k^2$ registering units, tens, and hundreds, respectively, of the upper mechanism K' being loosely mounted on the shaft $k^4$ and the corresponding barrels of the lower mechanism K$^2$ being loosely mounted on the shaft $k^5$. Suitably secured to the units-wheel of each registering mechanism is a ratchet-wheel $k^6$, adapted to be moved forward one notch at a time by means of the pawl $k^7$, pivoted at $k^8$ to its pawl-lever $n^6$, and pressed into normal engagement with the ratchet-teeth by means of a gravity weight or spring $k^9$. The dog $k^{10}$, under suitable pressure, herein shown as by means of the gravity-weight $k^{11}$, serves to prevent backward rotation of the ratchet-wheel $k^6$ when the actuating-pawl $k^7$ is being retracted by means of its spring $n^7$.

I have herein shown the different pawl-levers $n^6$ arranged one above the other in substantially vertical alinement. In order to permit of this compact arrangement, it is necessary that the upper pawl-lever $n^6$ of each pair of registering mechanisms should be fast on its shaft $k^4$, its pawl $k^{12}$ being carried by the arm $k^{13}$, fixed on the shaft $k^4$, adjacent its ratchet-wheel $k^6$.

Each registering-dial is permanently numbered to correspond to the individual key that operates that dial, the keys being successively numbered. So that by this means when key 20, for example, is voted register 20 will be operated and all confusion of names and registers or location of registers is absolutely avoided. The wheels $k'$ $k^2$ are operated in the ordinary manner by means of the intermittent gears $k^{14}$ $k^{15}$, so that at every revolution of the units-wheel the tens-wheel is moved forward one count, and at every tenth such forward movement of the tens-wheel the hundreds-wheel is moved one count in the manner well known in such devices.

In the use of my invention the legally-appointed guard or inspector of elections presides over the booth and controls the entrance-door A. When a voter presents himself, if he is entitled to vote the entire ticket the guard opens the door by means of the lock $a$ and swings the door wide open so as to move the lug $s'$ of the locking-rod S into position beneath the notch $s^3$, Fig. 10$^a$. The voter thereupon steps upon the platform C and thereby depresses the same, (which automatically registers his vote by means of the apparatus C',) so that the locking-lug $s'$ is above the platform. The guard then closes the door A, which movement carries the lug $s'$ into the position 1 of Fig. 10ª, so that the platform is locked in its depressed position and any attempted fraud of the voter in lifting his weight off from the platform is absolutely guarded against.

In case the voter presenting himself is not entitled to vote the entire ticket, but by reason of some real estate or other qualification is entitled only to a limited vote, the guard swings the door Q over into its closed position, Fig. 5, and locks the same by means of the latch $q^3$ and latch-plate $q^4$ or other suitable locking means provided therefor. The entrance-door A having been tightly closed the voter proceeds in entire secrecy and with due deliberation to select from each section the candidate for whom he will vote.

The names of the candidates and their political complexion are indicated by cards suitably placed behind the glass front of each section. (See Fig. 5.) The voter having selected his candidate presses in the voting-key G and thereby swings the bell-crank lever $n$ so as to draw upwardly on the rod $n^4$ and operate the registering mechanism by means of the pawl-lever $n^6$. This movement is permitted by the previous depression of the platform which lowered the actuating-frame F, so that the shoulders $o'$ would withdraw from their supporting relation beneath the locking-bars O and the latter drop into suspended position on the lugs $o^3$ of the plates $o^4$.

As a vote is registered in each section by moving in one of the keys thereof the key enters through the corresponding opening $o^5$ of the locking-bar O and pushes the plate $o^4$ out of sustaining engagement with the locking-bar, so that the latter is permitted to drop against the voting-key, and the key is securely held in its voted position by means of the tongue $o^8$ engaging with the notch $g^8$.

It is impossible for the voter to operate two keys in the same section either at the same time or separately, for the reason that the apertures of the bars $m^3 m^4$ are out of alinement with each other and with the guiding-holes of the guide-plate M and are slid one on the other by the tapered shoulders $g^2$ of the voting-keys, so that it is only possible for one key to be forced into its completely depressed or voted position when all the other keys are in their completely-retracted position, and if the two keys are partially pushed in they lock each other, so that neither one can be voted.

The voter is at liberty to vote for one candidate in each of the exposed sections.

In case the voter desires to vote the straight-party ticket he presses in the voting-key of his party in the straight-party section, (herein shown in the lower tier at the right,) and this movement of the voting-key slides the detector-frame to the left, as shown in Fig. 18, so that all the keys of all the other sections are thereby locked, and the remaining keys of the straight-party section are also locked by means of the bars $m^3 m^4$ of that section, the same as in the case of the individual voting in the other sections. Thus when a voter prefers to vote simply the straight-party ticket without otherwise selecting his candidates he can do so by pressing in one voting-key only. and any further voting is absolutely prevented by means of the detector-frame, as just explained.

In case the voter prefers to vote an independent ticket of his own making he presses in the independent-voting key $G'$ and thereby raises the sliding cover $P^2$ and also, through the cam mechanism $p^6$, at the same time raises the table $p$ to receive his independent ballot, the opening P P' admitting his thumb and finger for accurately and conveniently placing his ballot on the table $p$ between the same and the bracket $p^2$, Fig. 5, these ballots being prepared on blanks of uniform size and thickness furnished by the proper election officers.

An independent-voting key is provided in each section for the various offices, so that a voter may select his own candidate for each office if he so desires.

Having voted, the voter opens the exit-door B by means of the lock $b$ and steps off the platform C, the opening of the door announcing his exit by means of the bell $b^2$. If by collusion with the voter departing another person should attempt to step into the booth through the exit-door, he will not be able thereby to accomplish anything, for the reason that the platform C remains depressed until the guard opens the entrance-door, and so long as the platform remains depressed the sections which have been voted all remain locked against further voting. When, however, the exit-door B has been closed by means of its spring-hinges and the guard has partly opened the entrance-door A, so as to bring the lug $s'$ over the notch $s^2$, the platform, as before stated, springs up and allows the complete opening of the entrance-door preparatory to admitting another voter.

By reference to Fig. 19 it will be seen that the raising of the platform C at once serves, by means of the actuating-frame F, to release all of the voting-keys which have been depressed.

I do not restrict my invention to the provision of an independent-voting key, inasmuch as it is obvious that the voting-booths may be used without this provision, if desired; nor do I restrict my invention to the arrangement of sections with one office for each section, inasmuch as the sections may be arranged by parties having the candidates for all the offices of the entire party-ticket designated in one section, or the arrangement may be otherwise varied, as desired.

When the voting is finished, the proper officers open the doors J J and inspect the number of votes cast for each candidate or for each party, as indicated by the respective registering mechanisms K, and unlock the door L, so as to remove and count the number of independent ballots cast, the record being also kept of the number of voters by an inspection of the registering mechanism C'. The dials are read off by number and so recorded—as, for instance, "No. 20 received 67 votes"—each dial having its permanent designating-number. The canvassers of election or other proper officers then ascertain the name of the candidate which was opposite the correspondingly-numbered voting-key and then place this name against the record of that number dial. Thus there is no confusion in reading the dials.

I do not desire to be limited to the precise arrangement herein shown, inasmuch as many changes and modifications may be resorted to without departing from the spirit and scope of my invention.

What I claim is—

1. In a voting-machine, a voting-key, a lever operated thereby, registering mechanism connected to said lever, a spring under tension to maintain said key in its normal non-voting position, a lock to automatically lock said key when the latter is depressed into voting position and retain the same against the tension of said spring, a movable platform on which the voter stands when voting, a spring tending to raise said platform, and an actuating-frame operated by the upward movement of said platform to release said lock and permit said key to be moved into its said normal position, substantially as described.

2. In a voting-machine, the combination with the voting mechanism comprising a series of voting-keys arranged to coöperate in a section, of a movable platform hinged at one edge and adapted to receive the voter thereon, and means connected therewith for locking the voting mechanism against operation when said platform is in its raised position, said means being moved into unlocking position by the depression of said platform, to thereby permit the operation of one voting-key and to interlock the remaining voting-keys against operation, substantially as described.

3. In a voting-machine, the combination with an entrance-door thereto, of a movable platform hinged at one edge, and means actuated by the movement of said platform for controlling the voting mechanism, of a locking mechanism for locking said platform in its depressed position when the door is closed, the opening of said door serving to unlock said platform and permit the same to be raised into its normal elevated position, substantially as described.

4. In a voting-machine, voting mechanism, a movable platform on which the voter stands to vote, and controlling connections between the platform and said mechanism, whereby the latter is controlled by the former, substantially as described.

5. In a voting-machine, voting mechanism, a movable platform, a register for the number of voters, and a connection between said platform and said register, whereby each voter is registered automatically by stepping on the platform, said platform and voting mechanism being arranged so that the voter cannot have access to the latter to vote without stepping on the platform, substantially as described.

6. In a voting-machine, the combination with a voting mechanism and an entrance-door thereto, of a movable platform adapted to be depressed by the weight of the voter thereon, said platform being provided with two notches, and a rod provided with a lug to enter said notches, said rod being connected to operate by the movement of said door, whereby said platform can be moved only when said lug is in proper position in relation to one or the other of said notches, substantially as described.

7. In a voting-machine, the combination with the voting mechanism and an entrance-door thereto, of a movable platform adapted to be depressed by the weight of the voter thereon, said platform being provided with two notches, one of said notches having a beveled side, and a rod provided with a lug to enter said notches and having a beveled side to coöperate with said beveled notch to forcibly move said platform, said rod being connected to operate by the movement of said door, whereby said platform can be moved only when said lock is in proper position in relation to one or the other of said notches, substantially as described.

8. In a voting-machine, mechanism for operating the voting-registers, including a series of voting-keys having engaging notches, guides therefor, a perforated locking-bar arranged to operate by gravity to engage said notches when the keys are moved into voting position and thereby lock said keys against a return movement, said bar being normally raised to present a solid portion to prevent the movement of said keys into voting position, and means controlled by mechanism operated by the entrance of a voter to the keys for lowering said locking-bar into position to receive and lock the keys when moved into locking position, substantially as described.

9. In a voting-machine, mechanism for operating the vote-registers, including a series of voting-keys having engaging notches, guides therefor, a locking-bar arranged to operate by gravity to engage said notches when the keys are moved into voting position and thereby lock said keys against a return movement, said bar also intercepting by its movement the others of said keys from being moved into voting position, and a movable plate normally in position to hold said bar in its unlocked position, said plate being arranged to be operated by the voting movement of said keys to release said locking-bar, substantially as described.

10. In a voting-machine, mechanism for operating the vote-registers, including a series of voting-keys having engaging notches, guides therefor, a locking-bar simultaneously locking all of said keys, said bar being arranged to operate by gravity to engage said notches when the keys are moved into voting position, and thereby lock said keys against a return movement, the said locking-bar holding the voted or actuating key in its voting position, and holding the other keys in their normal or non-voting positions, and maintaining said keys so held, and an actuating-frame and means to operate the same to restore said locking-bar to its unlocked position out of engagement with said keys, substantially as described.

11. In a voting-machine, mechanism for operating the vote-registers, including a series of voting-keys having engaging notches, guides therefor, a locking-bar arranged to operate by gravity to engage said notches when the keys are moved into voting position, and thereby lock said keys against a return movement, means operated by the voting movement of one key to positively hold the other keys against movement, an actuating-frame and means to operate the same to restore said locking-bar to its unlocked position out of engagement with said keys, and a movable plate normally in position to hold said bar in its unlocked position, said plate being arranged to be operated by the voting movement of said keys to release said locking-bar, substantially as described.

12. In a voting-machine, a movable platform for the voter, mechanism for operating the vote-registers, including a series of voting-keys having engaging notches, guides therefor, a locking-bar arranged to operate by gravity to engage said notches when the keys are moved into voting position and thereby lock said keys against return movement, an actuating-frame to restore said locking-bar to its unlocked position, and connections between said frame and said platform whereby said actuating-frame is prevented from operating until the voter steps from said platform, substantially as described.

13. In a voting-machine, a movable platform for the voter, mechanism for operating the vote-registers, including a series of voting-keys having engaging notches, guides therefor, a perforated locking-bar arranged to operate by gravity to engage said notches when the keys are moved into voting position and thereby lock said keys against return movement, a movable plate normally in position to hold said bar in its unlocked position, said plate being arranged to be operated by the voting movement of said keys to release said locking-bar, an actuating-frame to restore said locking-bar to its unlocked position and move the same out of register with said keys to prevent movement of said keys into voting position, and connections between said frame and said platform whereby said actuating-frame is prevented from operating until the voter steps from said platform, substantially as described.

14. In a voting-machine, the combination with a section of voting-keys having reduced portions tapering toward their inner ends, and guides for said keys, of two bars provided with perforations to receive the larger portions of said keys and loosely mounted to reciprocate transversely to said keys at the reduced portions thereof, said perforations in the two bars being out of true alinement with each other and with said guides, whereby only one key can be operated at a time, substantially as described.

15. In a voting-machine, the combination with a plurality of voting-keys arranged in sections, said keys having reduced portions tapering toward their inner ends, and guides for said keys, of a movable frame for said sections, provided with engaging portions to receive the larger portions of said keys, and loosely mounted to reciprocate transversely to said keys at the reduced portions thereof, the said engaging portions for one or more of said sections being normally out of true alinement with the keys thereof, and the said engaging portions for the remaining sections being normally in true alinement with the keys of said remaining sections, whereby the operation of a key in one of said former sections wedges the said frame over thereby moving the engaging portions for the latter sections abnormally out of their true alinement and locking the keys thereof against movement, substantially as described.

16. In a voting-machine, an independent-voting mechanism, comprising a voting-key, a table pivoted adjacent thereto, a cam connected to said table, and an operating-lever actuated by said key and working on said cam to move said table into position to receive the independent vote, substantially as described.

17. In a voting-machine, an independent-voting mechanism, comprising a voting-key, registering mechanism operated thereby, a table pivoted adjacent said key, a cam connected to said table, and an operating-lever actuated by said key and working on said cam to move said table into position to receive the independent vote, substantially as described.

18. In a voting-machine, an independent-voting mechanism comprising a voting-key, a table pivoted adjacent thereto, a cover normally concealing said table and connected to operate therewith, a cam connected to said table, and an operating-lever actuated by said key and working on said cam to move said table into position to receive the independent vote, substantially as described.

19. In a voting-machine, a narrow slot shaped to receive a ballot, said slot being provided with an upper recess P and lower recess P' for the thumb and finger respectively, to facilitate the depositing of the ballot therein, whereby the ballot may be retained by the thumb and finger until it is through the slot, substantially as described.

20. In a voting-machine, a plurality of voting mechanisms, a door hinged at one edge adapted to be swung over to inclose certain of said voting mechanisms and prevent access thereto, a spring normally holding said door open, and means under control independent of the voter for locking said door in closed position, substantially as described.

21. A voting-booth, an entrance-door therefor, a plurality of voting-keys, a door hinged adjacent said entrance-door, provided with one or more recesses to inclose certain of said voting-keys and prevent access thereto, a spring normally causing said door to move with said entrance-door, and means under control independent of the voter for locking said door in closed position, substantially as described.

22. A vote-registering mechanism, comprising two adjacent parallel shafts, counting-wheels loosely mounted thereon at opposite ends thereof respectively, a ratchet-wheel secured to either units-wheel, a pawl fixed on one shaft between said respective counting-wheels to actuate the adjacent ratchet-wheel, a lever fixed on said shaft to operate said pawl, a pawl and its lever mounted on the other of said shafts to actuate the other of said ratchet-wheels, and gears loosely mounted on the said shafts opposite the respective counting-wheels, to automatically operate the tens and hundreds wheels as the respective units-wheel is actuated, substantially as described.

23. A voting-case, comprising a plurality of sections, each section having a suitable frame, said frames being independent and placed edge to edge adjacent to each other, and having head-plates overlapping said contiguous edges of adjoining frames, and bolts passed between said edges and through said plates and adjacent back portions of the case to retain said frames together in proper position, substantially as described.

24. A voting-case, having at its front side a plurality of frames set edge to edge, substantially as described, head-plates overlapping contiguous plates at their adjoining edges, spacing-sleeves set endwise against and between said frames and the back of the case, and bolts passed between said frames through said plates and sleeves and secured to the back of the case.

25. In a voting-machine, a case containing a plurality of sections arranged in tiers, each section having a card-slot to receive cards designating the candidates or containing other data, combined with a door extending adjacent a plurality of said sections to control the entrance to the respective card-slots thereof, substantially as described.

PASCAL HYDE STEDMAN.

Witnesses:
N. JAMES DE BLOIS,
JOHN F. J. O'CONNOR.